United States Patent
Rieger, III

(10) Patent No.: US 8,548,493 B2
(45) Date of Patent: Oct. 1, 2013

(54) LOCATION TRACKING

(75) Inventor: Charles J. Rieger, III, Potomac, MD (US)

(73) Assignee: Navteq B.V., Veldhoven (NL)

( * ) Notice: Subject to any disclaimer, the term of this patent is extended or adjusted under 35 U.S.C. 154(b) by 0 days.

(21) Appl. No.: 13/115,499

(22) Filed: May 25, 2011

(65) Prior Publication Data

US 2012/0264447 A1 Oct. 18, 2012

Related U.S. Application Data

(60) Provisional application No. 61/475,360, filed on Apr. 14, 2011.

(51) Int. Cl.
H04W 24/00 (2009.01)

(52) U.S. Cl.
USPC .......... 455/456.1; 455/404.2; 455/432.1; 455/436; 455/440; 455/456.3

(58) Field of Classification Search
USPC .......... 455/404.1–404.2, 432.1, 432.3–435.1, 455/436, 440–441, 456.1–456.3, 457
See application file for complete search history.

(56) References Cited

U.S. PATENT DOCUMENTS

| | | | |
|---|---|---|---|
| 6,654,800 | B1 | 11/2003 | Rieger, III |
| 6,799,047 | B1 * | 9/2004 | Bahl et al. .......... 455/456.1 |
| 7,116,988 | B2 | 10/2006 | Dietrich et al. |
| 7,136,915 | B2 | 11/2006 | Rieger, III |
| 7,224,984 | B2 | 5/2007 | Agrawala et al. |
| 7,406,116 | B2 | 7/2008 | Agrawala et al. |
| 2002/0005804 | A1 | 1/2002 | Suprunov |
| 2004/0203913 | A1 * | 10/2004 | Ogino et al. .......... 455/456.1 |
| 2005/0208952 | A1 | 9/2005 | Dietrich et al. |
| 2006/0089153 | A1 | 4/2006 | Sheynblat |
| 2008/0004042 | A1 * | 1/2008 | Dietrich et al. .......... 455/456.1 |
| 2008/0026733 | A1 * | 1/2008 | Jaatinen .......... 455/414.2 |
| 2009/0005083 | A1 * | 1/2009 | Hoshino et al. .......... 455/456.5 |
| 2009/0011779 | A1 * | 1/2009 | MacNaughtan et al. ... 455/456.6 |
| 2009/0322603 | A1 | 12/2009 | Liao |
| 2010/0130229 | A1 * | 5/2010 | Sridhara et al. .......... 455/456.1 |
| 2010/0238862 | A1 | 9/2010 | Davidson et al. |
| 2011/0045840 | A1 * | 2/2011 | Alizadeh-Shabdiz et al. .......... 455/456.1 |
| 2011/0171973 | A1 * | 7/2011 | Beck et al. .......... 455/456.2 |
| 2011/0176494 | A1 * | 7/2011 | Huang et al. .......... 370/329 |
| 2011/0177831 | A1 * | 7/2011 | Huang .......... 455/457 |
| 2012/0094688 | A1 * | 4/2012 | Gravely et al. .......... 455/456.1 |

FOREIGN PATENT DOCUMENTS

| EP | 1022578 | 7/2000 |
|---|---|---|
| EP | 1359714 | 11/2003 |

OTHER PUBLICATIONS

Tauber, Joshua A., "Indoor Location Systems for Pervasive Computing" Paper (Aug. 8, 2002).
Liu, H., Darabi, H., Banerjee, P., and Liu, J., "Survey of Wireless Indoor Positioning Techniques and Systems", IEEE Transactions on Systems, Man, and Cybernetics-Part C: Application and Reviews, vol. 37, No. 6 (Nov. 2007).
European Search Report issued in related European Patent Application EP 12 16 1118 dated Aug. 3, 2012.

* cited by examiner

*Primary Examiner* — Dai A Phuong
(74) *Attorney, Agent, or Firm* — Lempia Summerfield Katz LLC

(57) ABSTRACT

One or more systems, devices, and/or methods for tracking a wireless device are disclosed. For example, a method includes receiving signal strength data for each of a plurality of access points. The signal strength data from the plurality of access points is compared to identify an anchor access point having a highest signal strength. Remaining signal strength data from the plurality of access points are compared to a threshold signal strength to identify at least one attractor access point. A memory is accessed for locations of the anchor access point and the at least one attractor access point. A pull point is calculated along a line from the anchor access point to the at least one attractor access point. A location of the wireless device is estimated as an average of the pull point and the location of the anchor access point.

20 Claims, 9 Drawing Sheets

130

131

| MAC Address | Radio Space |
|---|---|
| 0C-0C-0B-14-CD-98 | 1 |
| 0C-0B-0B-23-FA-99 | 1 |
| 0C-21-0B-42-AD-E9 | 1 |
| 0C-1D-0B-14-CD-E8 | 1 |
| 0C-04-0B-14-CD-E7 | 1 |

| MAC Address | Radio Space |
|---|---|
| 00-02-EE-22-AD-08 | 2 |
| 00-02-EE-0B-13-E7 | 2 |
| 00-02-EE-14-CD-B7 | 2 |
| 00-02-EE-18-CD-B7 | 2 |
| 00-02-EE-0B-13-E9 | 2 |
| 00-02-EE-22-AD-08 | 2 |

132

| MAC Address | X Value | Y Value |
|---|---|---|
| 0C-0C-0B-14-CD-98 | X1 | Y1 |
| 0C-0B-0B-23-FA-99 | X2 | Y2 |
| 0C-21-0B-42-AD-E9 | X3 | Y3 |
| 0C-1D-0B-14-CD-E8 | X4 | Y4 |
| 0C-04-0B-14-CD-E7 | X5 | Y5 |
| 00-02-EE-22-AD-08 | X8 | Y8 |
| 00-02-EE-0B-13-E7 | X9 | Y9 |
| 00-02-EE-14-CD-B7 | X10 | Y10 |
| 00-02-EE-18-CD-B7 | X11 | Y11 |
| 00-02-EE-0B-13-E9 | X12 | Y12 |
| 00-02-EE-22-AD-08 | X13 | Y13 |

FIG. 4

LOCATION TRACKING

CROSS-REFERENCE TO RELATED APPLICATION

This application claims the benefit of U.S. Provisional Application No. 61/475,360 filed Apr. 14, 2011, which is hereby incorporated by reference in its entirety.

BACKGROUND OF THE INVENTION

The present invention relates to location, maps, and/or navigation and, more particularly, to location tracking method(s) and system(s).

Signal strength may be used to determine the location of a device throughout an intended coverage area. Conventional systems require a calibration phase, in which the device is systematically positioned at various points throughout the radio space in order to capture a set of signal strength samples for signals transmitted within range. After signal strength samples have been captured at all the desired calibration points, software may build a "radio map" of the coverage area. The radio map may include signal strength probability densities throughout the coverage area. Once the calibration phase is complete, the device or other user devices report signal strength values to the system, which predicts the location of the device by comparing the reported values in the radio map.

However, the calibration phase is time-consuming, and obstacles in the coverage area that alter signals disrupt the results. One common obstacle is human bodies, which may be modeled as large sacks of fluid that absorb energy. Human bodies are likely less prevalent in the calibration phase than when the system is implemented, which leads to inaccuracies. Further, the results may be unreliable because any object moved from calibration phase locations can significantly alter the radio map. In outdoor environments, seasonal changes such as leaves on trees or shrubs in warmer months impact the radio map. In indoor environments, changing inventory on store shelves, moved kiosks, or nearby people impact the radio map.

In addition, the various brands and technologies of user devices sense and report signal strengths in different ways. For example, the wide variety of antenna configurations used in the wireless industry results in different signal strength values, which also may be measured using varying signal strength units. Empirical tests have shown determining the current location of a device of brand X when the radio space has been calibrated for a device of brand Y is difficult and universal mapping algorithms to account for the differences among device types may not be feasible.

SUMMARY OF THE INVENTION

According to one aspect, a method of tracking a wireless device is provided. The method includes receiving signal strength data for each of a plurality of access points. The signal strength data from the plurality of access points is compared to identify an anchor access point having a highest signal strength. Remaining signal strength data from the plurality of access points are compared to a threshold signal strength to identify at least one attractor access point. A memory is accessed for locations of the anchor access point and the at least one attractor access point. A pull point is calculated along a line from the anchor access point to the at least one attractor access point. A location of the wireless device is estimated as an average of the pull point and the location of the anchor access point.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

FIG. 4 illustrates a detailed view of the database of FIGS. 2 and 3.

DETAILED DESCRIPTION OF THE PRESENTLY PREFERRED EMBODIMENTS

A location tracking algorithm estimates the location of a wireless device. The location tracking algorithm involves simple calculations and, for example in one embodiment, does not require any calibration phase. Signal strength data from access points in a radio space is analyzed. The access point with the highest signal strength is designated as the anchor and has the greatest impact on the estimation of the location of the wireless device. Remaining access points above a threshold, if any, are designated as attractor access points. Theoretical pull points are defined at specific locations along lines from the anchor access point to each of the attractor access points. The distances from the specific locations to the anchor access point may be inversely proportional to the relative signal strength of the respective attractor access point. In one embodiment, the location of the wireless device is estimated as the average of the pull points and the location of the anchor access point.

One or more of the example embodiments presented below describe a position tracking algorithm that, for example, does not depend on a calibration phase or any pre-recorded signal strength information. A wireless device scans a radio space for access points. The locations of the access points are retrieved from a memory or database. Based on relative signal strengths, the position tracking algorithm designates one or more of the access points as an anchor and one or more of the access points as an attractor. The position of the wireless device is determined based on a weighted average of the locations of the anchor and the attractors. The anchor is given the most weight, and the attractors are given variably less weight dependent on their relative signal strengths.

In some implementations, the position tracking algorithm provides only an estimate of the position of the wireless device. However, accuracies within a few to ten feet have particular useful applications, which may include any application where global positioning system (GPS) signals are not available, such as indoor environments. For example, a grocery store or other retail outlet may direct offers to the wireless device based on the proximity of the wireless device to particular products on the shelves. The offers may be directed to the user through a display on the wireless device or though an audio announcement delivered to the user from the wireless device with an earpiece.

Another example application tracks the location of people within a building in an evacuation or emergency situation. Another example application tracks people or assets such as office equipment within a building. The office equipment may permit different access levels based on physical location. If a person brings a laptop into a secured area, the network may consider the presence of the laptop in the secured area as authentication onto the network. Another example application monitors cars in a rail yard.

Figure 1:
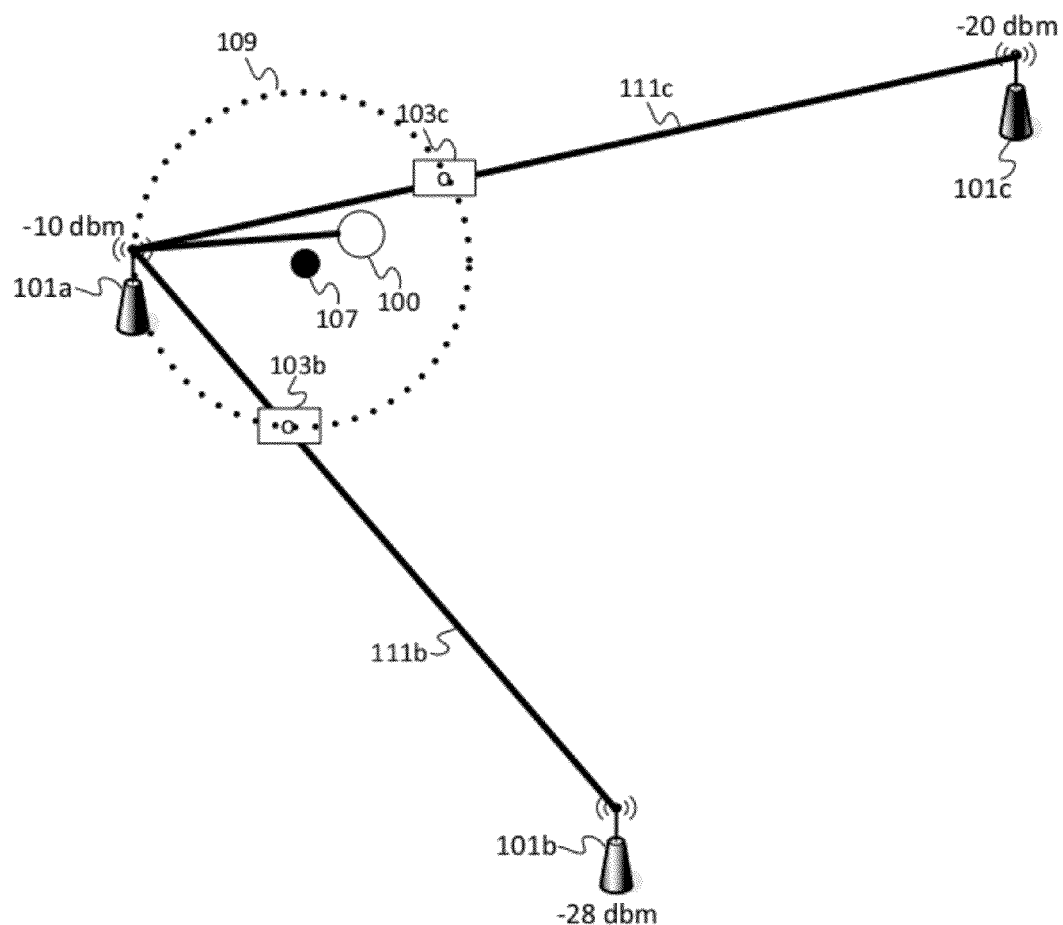
FIG. 1 illustrates an example embodiment for location tracking in a radio space.

FIG. 1 illustrates an example system for performing the position tracking algorithm in a radio space. The system includes a plurality of access points 101a-c and a navigation device 100. FIG. 1 illustrates three access points but as few as two and/or any number of access points are possible. The access points 101a-c may be referred to as wireless access points (e.g., computer and/or RF hardware configured as transmitter or transceiver devices) and are configured to utilize one or more wireless communication protocols or standards to communicate with wireless devices. The protocols or standards may include any of the protocols known as Wi-Fi, the protocols defined by the IEEE 802.11 standards, the protocols defined by the Bluetooth standards, or other protocols. The access points 101a-c may facilitate communication between a network and wireless devices. However, no connection to a network for some or all of the access points 101a-c may be provided in the following implementations.

While not drawn strictly to scale, FIG. 1 illustrates that access point 101a is the closest to the navigation device 100, access point 101b is the farthest from the navigation device 100, and access point 101c is closer than access point 101b and farther than access point 101a from the navigation device 100.

The navigation device 100 receives at least one packet from each of the access points 101a-c. The navigation device 100 determines the signal strength of the packet. The signal strength may be measured in signal strength units. The signal strength units may measure peak power in milliwatts or the power ratio of the measured power in decibels referenced to one milliwatt (dbm). The signal strength units may be specific to the operating system of the navigation device 100 and thus may be proportional to the power or the dbm value. For example, the signal strength may be measured in bars or another integer scale, with a variable number of dbm corresponding to each bar or interval.

In the example shown in FIG. 1, the navigation device 100 receives signal strength data indicative of −10 dbm based on a packet from access point 101a, signal strength data indicative of −28 dbm based on a packet from access point 101b, and signal strength data indicative of −20 dbm based on a packet from access point 101c. The packets may be management frames generated in the data link (layer 2) of the open systems interconnection (OSI) model. For example, the packets may be beacon frames, which may include a machine access control (MAC) header, and a body, including one or more of a timestamp field, a beacon interval until the next beacon frame, and communication parameters to specify signaling such as a frequency hopping sequence or a spread spectrum sequence.

The following analysis of the strength data may occur at the navigation device 100 or externally on a server in communication locally via a network or remotely via the Internet. For example, the navigation device 100 may communicate the signal strength data to the server through one or more of the access points 101a-c or through a cellular or other connection. The signal strength data from the access points 101a-c are compared with one another. The access point 101a-c having the highest signal strength is identified as an anchor access point. The determination of the location of the navigation device 100 is based around the location of the anchor access point. In the example shown in FIG. 1, access point 101a is the anchor access point.

The remaining signal strength data from the other access points 101b-c are compared to a threshold signal strength. The threshold signal strength may be calculated based on the signal strength of the anchor access point. For example, the threshold signal strength may be 20 signal strength units below the signal strength of the anchor access point. In the example shown in FIG. 1, the signal strength of the anchor access point (access point 101a) is −10 dbm, and thus, the threshold signal strength may be −30 dbm. Any access points that are above the threshold signal strength are identified as attractor access points. The access points that are below the threshold do not impact the calculations. The attractor access points affect the determined location of the navigation device 100 in varying degrees. Access points 101b and 101c are attractor access points.

In some situations, no access points are designated as attractor access points. If no other access point except the anchor access point is above the threshold, then no attractor access points are designated. In this situation, the location of the anchor access point is used as the estimated location of the navigation device 100. For example, consider the example shown in FIG. 1 modified such that a signal strength data indicative of −10 dbm is received from access point 101a, signal strength data indicative of −40 dbm is received from access point 101b, and signal strength data indicative of −50 dbm is received from access point 101c. In this example, neither access point 101b nor access point 101c is designated as an attractor access point because the signal strengths of access point 101b and access point 101c are not within the threshold of 20 dbm of access point 101a. Because there are no attractor access points, the location of navigation device 100 is estimated as the known location of access point 101a.

The location of the navigation device 100 is estimated from the locations of the anchor access point and the attractor access point. Either the navigation device 100 or the server calculates a pull point along a line segment from the anchor access point to each of the attractor access points. FIG. 1 illustrates line segment 111c including pull point 103c and line segment 111b including pull point 103b. The location of the pull points 103b-c along the line segments 111b-c is determined by a pull factor, which is based on the signal strengths of the access points 103b-c. The pull factor may be a value between 0 and 1 or alternatively, a percentage. The pull factor defines the location of pull point along the line segment connecting access points. Alternatively, the pull factors may be calculated from the difference or ratio between the anchor access point and the respective one of the attractor access points.

For example, as shown in FIG. 1, if the pull factor for access point 101c is 0.4, the pull point 103c is at a point approximately 40% of the distance along line segment 111c from access point 101a to access point 101c, and if the pull factor for access point 101b is 0.3, the pull point 103b is at a point approximately 30% of the distance along the segment 111b from access point 101a to access point 101b.

The location of the navigation device 100 is calculated from the pull points. For example, the locations of the pull points 103b-c and the location of the anchor access point 101a are averaged. The locations may be averaged using various methods such as triangulation or arithmetically using coordinates. For example, if the locations are in an X-Y plane, the X values of each of the locations of the anchor access point and the pull points are averaged for a resultant X value and the Y values of each of the locations of the anchor access point and the pull points are average for a resultant Y value. The average of the location of anchor access point 101a, pull point 103b, and pull point 103c is estimated location 107, as illustrated by a dotted circle 109. The estimated location 107 is near the actual location of the navigation device 100.

Figure 2:
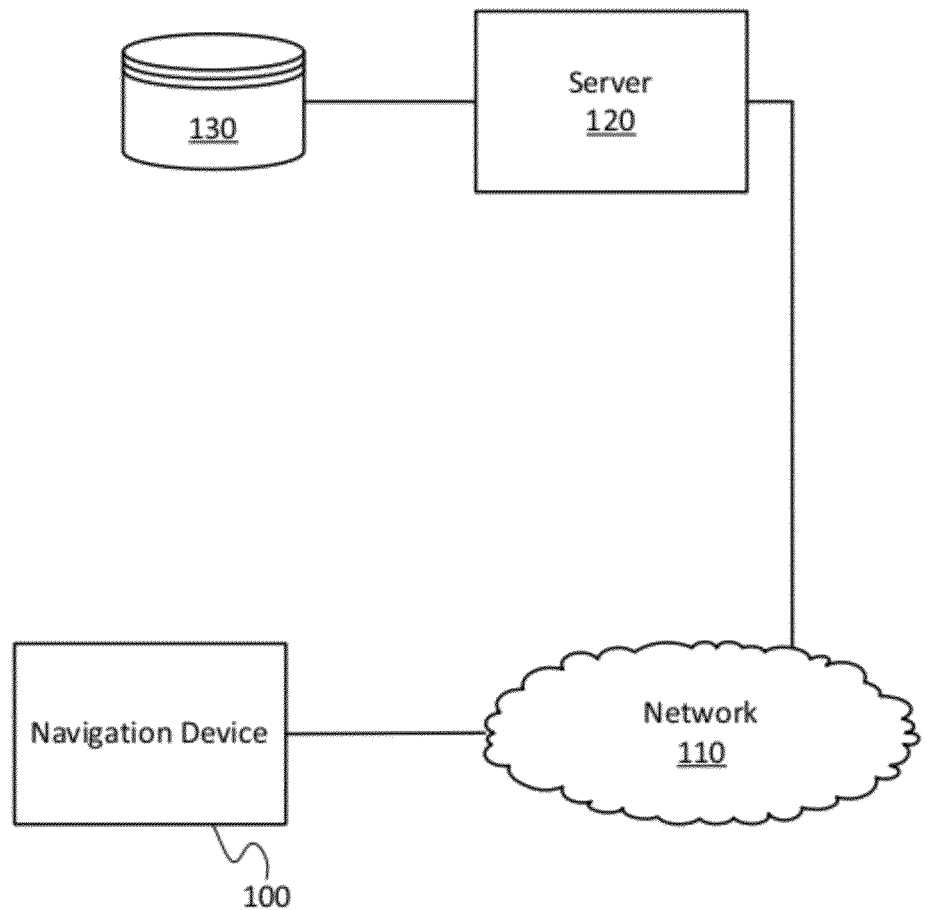
FIG. 2 illustrates an example communication system.

FIG. 2 illustrates an example communication system 150. The communication system 150 includes the navigation device 100, a network 110, a server 120, and a database 130. The following three embodiments distribute the processing requirements of position tracking algorithm in the radio space between the navigation device 100 and server 120. In all three embodiments, the navigation device 100 may be a cellular telephone (smart phone), a personal digital assistant ("PDA"), a tablet computer, a laptop, a personal navigation device ("PND"), or any portable communication device. The navigation device 100 may run a mobile operating system such as Nokia's Symbian, Nokia's MeeGo, Nokia's Maemo, Android, iOS, Blackberry OS, Windows Phone, Windows Mobile, WebOS, Bada, or Brew OS, or another mobile operating system on any mobile device. Full operating systems (e.g. Windows, Unix, Mac OS) running on, for example, a laptop, are also possible. The operating system may be configured to automatically scan the radio space to provide a list of access points within range and signal strengths of the access points. The navigation device 100 may also be a radio frequency (RF) tag or Wi-Fi tag, as discussed in more detail below.

In the first and second embodiments the server 120 and database 130 may be on the same network 110 as the navigation device 100 or located remotely, where network 110 includes the Internet. In the first embodiment, instructions for location tracking in the radio space are found on server 120. The server 120 receives signal strength data from the access points by way of the navigation device 100, compares the signal strength data to determine the anchor access point and attractor access points, and accesses the database 130 for locations of the anchor access point and the at least one attractor access point. The server 120 may also calculate the pull points and estimate a location of the navigation device 100 (wireless device) as an average of the locations of the pull points and the location of the anchor access point. The estimated location may be communicated back to the navigation device 100 for display to a user.

In the first embodiment, the navigation device 100 may be an RF tag, which is a low cost device that receives signals from the access points 101a-c. The RF tag is a low-energy, embedded system, which may comprise a processor, and a memory storing a protocol stack such as Wi-Fi or Bluetooth low energy (Wife Tag or Bluetooth Tag). The RF tag may receive signal strength data and report the signal strength data to server 120. In this scenario, the server 120 determines the location of the RF tag through communication with the RF tag and may then communicate with the user through another wireless device via text message, email, or another application.

In the second embodiment, the navigation device 100 performs more of the analysis in the location tracking algorithm. For example, the navigation device 100 may receive signal strength from the access points 101a-c and compare the signal strength to identify the anchor access point and the attractor access points. The navigation device 100 may send an instruction to server 120 to access database 130 for locations of the anchor access point and the attractor access points. The navigation device 100 calculates the pull points between the anchor access point and the attractor access points and estimates a location of the navigation device 100 by averaging the locations of the pull points and the location of the anchor access point.

In the third embodiment, all instructions for location tracking in the radio space are found on the navigation device 100 and no connection to the network 110 is necessary. The navigation device 100 includes a database with the locations of the access points.

Figure 3:
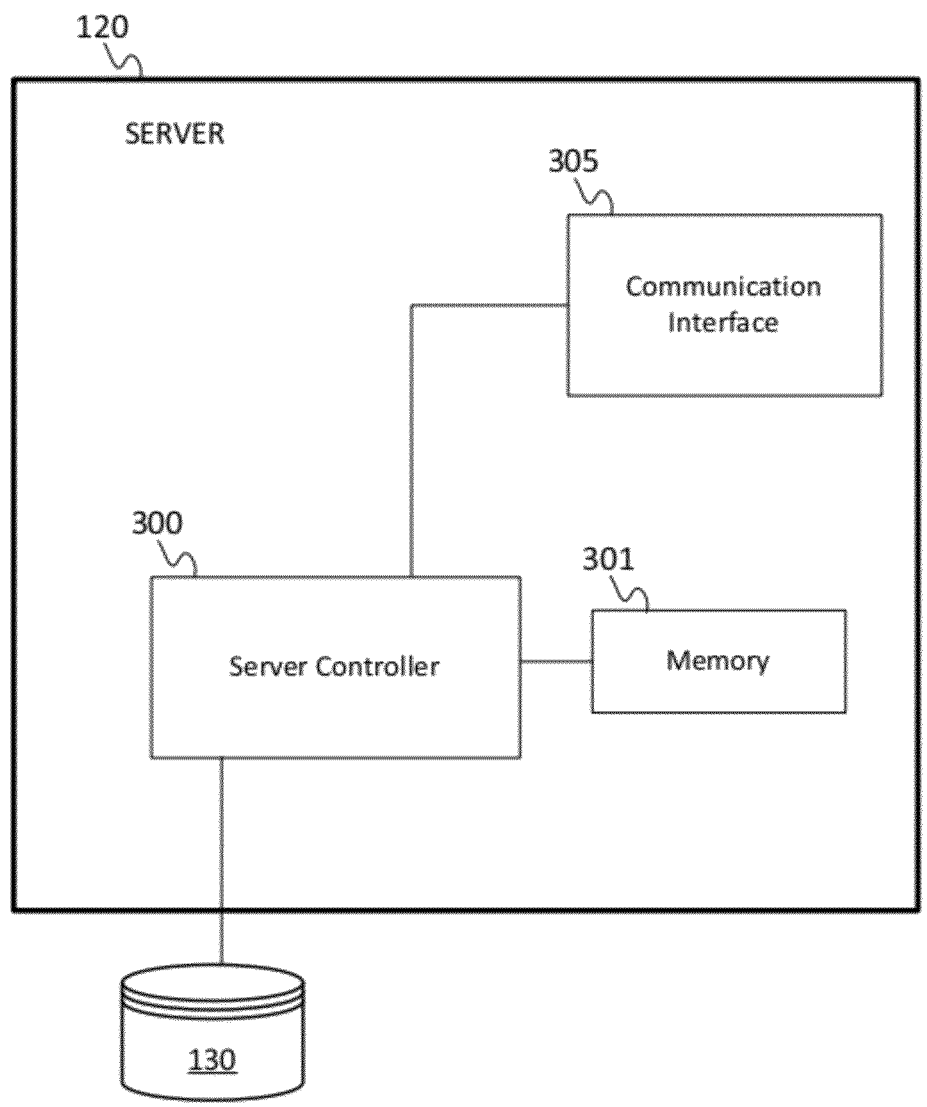
FIG. 3 illustrates an example of the server of the communication system of FIG. 2.

FIG. 3 illustrates an example of server 120, which may be used in the first embodiment or the second embodiment. The server 120 includes a server controller 300, a communication interface 305 and a memory 301. The server 120 may be in communication with database 130.

The communication interface 305 may receive the signal strength data of the access points 101a-c from the navigation device 100. The signal strength data may be calculated based on a packet conforming to the 802.11 or Bluetooth standards. For example, the Bluetooth low energy (BLE, 802.15.1, or Bluetooth 4.0) protocol utilizes a small packet size (60-70 bytes) and provides the signal strength data in units such as dbm. The power consumption in BLE, which may include transmit and receive modes averaging only tens of milliamps (mA) and sleep modes averaging only tens of nanoamps (nA) allow battery life to extend one or more years.

The server controller 300 may be configured to populate a list of the signal strength data from the highest power level to the lower power level. From the list, the server controller 300 may identify the anchor access point having a highest signal strength and one or more attractor access points within a predetermined range of the highest signal strength. The predetermined range may be 5 dbm, 10 dbm, 20 dbm, or 50 dbm, or a ratio such as 2 or 3.

The server controller 300 may also identify more than one anchor access point. That is, the server controller 300 may determine that a plurality of access points effectively "tie" as having the highest signal strength. For example, any access points within a predetermined range of the highest signal strength may be considered anchor access points. The predetermined range may be defined in signal strength units (e.g., 3 dbm, 1 dbm, or 5 dbm) or within a percentage of the signal strength of the anchor access point (e.g., 5%, 10% or 30%). When there are multiple anchor access points, the server controller 300 identifies those access points within the predetermined range of any of one of the anchor access points as attractor access points.

The server controller 300 may access database 130 for locations of the anchor access point and/or the at least one attractor access point. The locations of the access points may be measured manually at installation or a later time and entered into the database 130. The server controller 300 calculates a pull point along a line from the anchor access point to the attractor access point. The pull point, or more specifically, a distance between the pull point and the anchor access point is based on a difference in signal strength between the respective attractor access point and the anchor access point. The distance may be determined by a pull factor, which is assigned in intervals as stored in a look up table as shown below. A pull factor of 0.2 means that the pull point is a location 20% of the way along the line from the anchor access point to the attractor access point. The server controller 300 accesses the lookup table for each of the attractor access point signal strengths to determine a pull factor for each of the attractor access points.

TABLE 1

| Pull Factor | Signal Strength Difference (d) |
|---|---|
| 0.5 | d < 4 |
| 0.4 | 4 < d < 8 |
| 0.3 | 8 < d < 12 |
| 0.2 | 12 < d < 16 |
| 0.1 | 16 < d < 20 |
| 0 | 20 < d |

Alternatively, the pull factor may be defined by a continuous function for example:

$$\text{Pull Factor} = \frac{a}{d};$$

where d=(anchor signal strength)–(attractor signal strength) and a=2. The constant 'a' could also be 1, 3, or another integer or value. The pull factor is used to calculate the pull point for each attractor access point. The server controller 300 estimates the location of the navigation device 100 as the average of the locations of the one or more pull points and the location of the anchor access point.

If there are tied anchor access points, the process is repeated for each anchor access point, such that pull points are calculated for the one or more attractor access points for each anchor access points. The attractor access points may be used more than once. The server controller 300 estimates the location of the navigation device 100 as the average of the multiple pull points and the location of each of the anchor access points.

The navigation device 100 also receives addresses from the packets from the access points that are relayed to the server 120. The addresses are hardware addresses such as MAC addresses identifying the access points. The database 130 stores a list of the access point addresses for radio spaces.

FIG. 4 illustrates a detailed view of database 130. The database 130 may include one or more of a first lookup table 131 and a second lookup table 132. The first lookup table 131 lists all of the known MAC address for the access points in a radio space. The radio space may be indexed by a unique 64-bit integer. The server controller 300 may query the database 130 with one or more MAC addresses received by the navigation device 100 from the access points to determine which radio space the navigation device 100 is located in. Because MAC addresses are globally unique, any number of MAC addresses may be used by the server controller 300 to identify the radio space. However, for redundancy and accuracy, a plurality of MAC addresses (e.g., 2 or 3) may be used to identify the radio space.

Once the radio space is known, the server controller 300 accesses the database 130 for the locations of the access points in the radio space. The server controller 300 may retrieve locations of all access points in the radio space or only specific locations as needed. The MAC address may also be used directly to access the second lookup table 132 to determine the physical locations of access points. The second lookup table 132 may be divided by radio space or may be combined into a single table. The server controller 300 may query the second lookup table 132 to determine the location of the anchor access points and the attractor access points, which are ultimately used to determine the location of the navigation device 100. The locations may be in a 2-dimensional space, as shown, and a 3-dimensional space may be implemented using similar calculations. The first lookup table 131 and the second lookup table 132 may be combined.

The database 130 may be a geographic database or be stored in, associated with, and/or linked to a geographic database or geographic data thereof. Alternatively, the database 130 may be separate from the geographic database. In one embodiment, the geographic or map database includes data used for (or configured to be compiled to be used for) navigation-related services. For example, the geographic database includes node data records, road/path segment or link data records, point-of-interest ("POI") data records, and/or other data records. More, fewer, or different data records may be provided. For example, the other data records include cartographic ("carto") data records, routing data, and maneuver data.

The link data records are links or segments representing roads, streets, or paths (such as indoor paths or walkways). The node data records are end points corresponding to the respective links or segments of the path segment data records. The path link data records and the node data records represent a path network, such as used by pedestrians and/or other entities or vehicles.

The path/link segments and nodes may be associated with attributes, such as geographic or local coordinates, street/path names, address ranges, speed limits, turn restrictions at intersections, and other navigation related attributes, as well as POIs, such as gasoline stations, office locations, indoor POIs, hotels, restaurants, museums, stadiums, offices, automobile dealerships, auto repair shops, buildings, stores, parks, etc. The geographic database may include data about the POIs and their respective locations in the POI data records. The geographic database may also include data about places, such as cities, towns, or other communities, and other geographic features, such as bodies of water, mountain ranges, etc. Such place or feature data may be part of the POI data or may be associated with POIs or POI data.

The geographic database may be maintained by a map developer, such as NAVTEQ North America, LLC located in Chicago, Ill. The map developer may collect geographic data to generate and enhance the database. The geographic database may be a master geographic database stored in a format that facilitates updating, maintenance, and development. For example, the master geographic database or data in the master geographic database is in an Oracle spatial format or other spatial format, such as for development or production purposes. The Oracle spatial format or development/production database may be compiled into a delivery format, such as a GDF format. The data in the production and/or delivery formats may be compiled or further compiled to form geographic database products or databases, which may be used in end user navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce end user databases may be performed by a party or entity separate from the map developer. For example, a customer of the map developer, such as a navigation device developer or other end user device developer, may perform compilation on a received geographic database in a delivery format to produce one or more compiled navigation databases.

As mentioned above, the geographic database may be a master geographic database, but in alternate embodiments, the database may represent a compiled navigation database that may be used in or with end user devices to provided navigation-related functions. For example, the database may be used in and/or with the device 100 to provide an end user with navigation features. In such a case, the database may be downloaded or stored on the device 100, or the device 100 may access the database through a wireless or wired connection.

Figure 5:
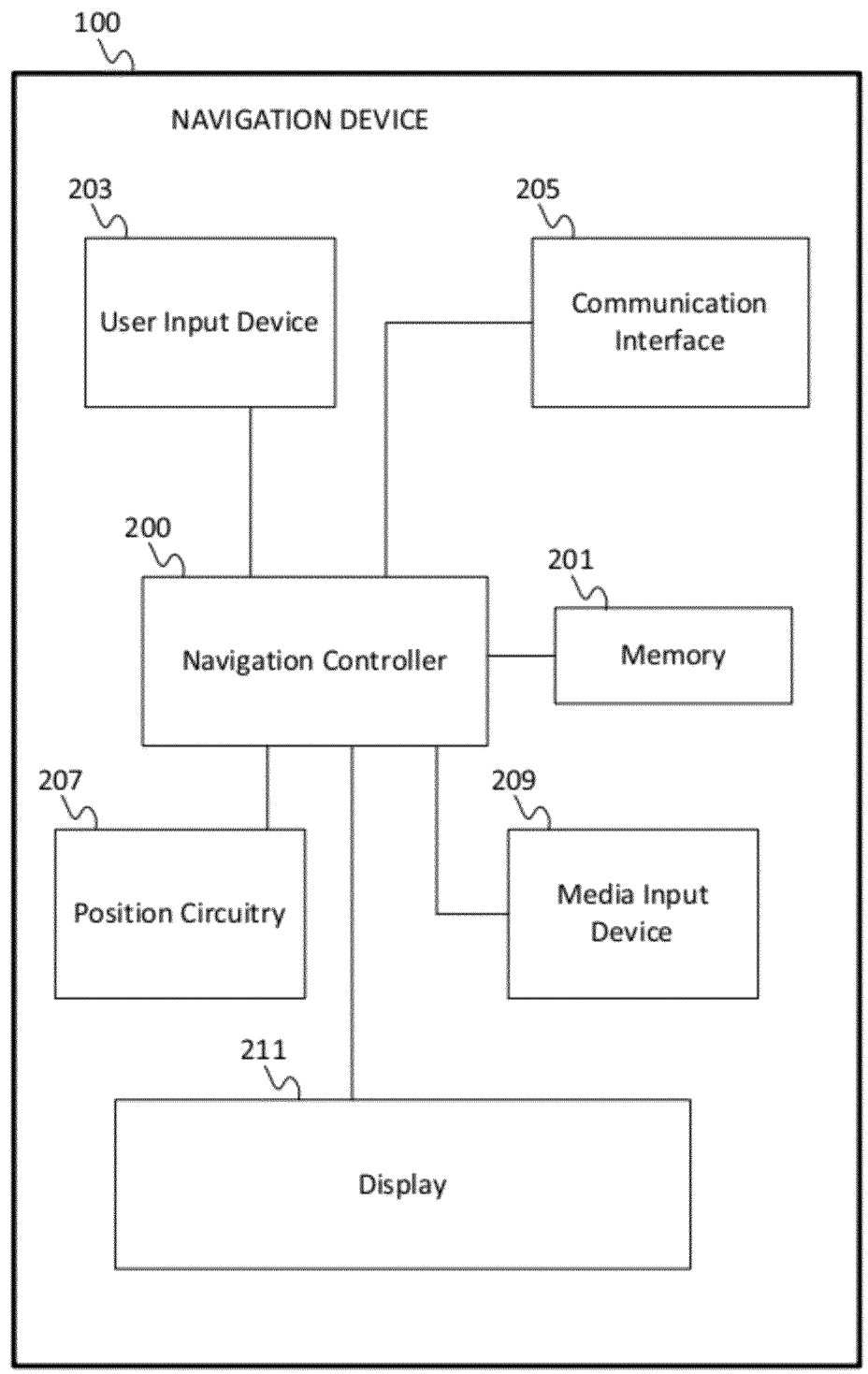
FIG. 5 illustrates an example of the navigation device of the communication system of FIG. 2.

FIG. 5 illustrates an example of the navigation device 100. The navigation device 100 includes a navigation controller 200, a memory 201, a user input device 203, and a communication interface 205. The navigation device 100 may also include position circuitry 207, a media input device 209, and a display 211. The navigation device 100 may be used in all three embodiments discussed above; however, some of the functions discussed below could also be performed by server 120. The memory 201 may store a location tracking software application downloaded from an application store over a cellular network or network 110 and executable by the navigation controller 200 to perform the location tracking algorithm.

The user input device 203 receives a command from a user to turn on the navigation device 100 or to activate the position tracking algorithm. The communication interface 205 scans a radio space for access points and receives packets from several access points. The scanning may be a five second polling loop which repeatedly senses the currently visible access points. The navigation device 100 determines signal strength data for the access points based on the received signal strength of the signals of the packets. The determination of signal strength data may be a function included in the operating system of the navigation device 100 or the protocol of the communication with the access points. The navigation device 100 extracts MAC address data from the packets and connects to server 120 to report the MAC address and request radio space information. The radio space information may include one or more of the radio space ID, the radio space map (which may be a JPEG, portable network graphics (PNG) file, vector based image, and/or any other image(s) or graphic(s)), a list of known access point locations within the radio space, and defined paths for the radio space. Therefore, the navigation device 100 identifies the radio space based on the MAC address data. Alternatively, the radio space information may be loaded into memory 201 or received through media input device 209 via a storage medium or wired communication.

After the radio space is known, the communication interface 205 continues to scan the radio space for access points and to receive signal strength data, which may calculated from IP packets or beacon frames. The scanning may repeat every predetermined time (e.g., 2 seconds, 200 milliseconds, or another time).

The navigation controller 200 may include a general processor configured to execute instructions for the position location tracking algorithm. The navigation controller 200 compares the signal strength data of the various access points to identify an anchor access point having a highest signal strength (or more than one anchor access points have nearly the same signal strength within a predetermined range). The navigation controller 200 may identify at least one attractor access point having a signal strength above a threshold signal strength, which is measured from the signal strength of the anchor access point. If no access points have a signal strength above the signal strength, the navigation controller 200 identifies no attractor access points, and the navigation controller 200 estimates the location of the navigation device 100 as the location of the anchor access point.

The navigation device 100 communicates with the database 130 either directly or through the server 120 to retrieve the locations of the anchor access point and the at least one attractor access point, which may be stored in memory 201. The navigation controller 200 calculates a pull point along a line from the location of the anchor access point and the location of the attractor access point. The pull point may be determined by a pull factor, which is defined by a stepwise function according to the difference in signal strength of the anchor access point and the respective attractor access point. The navigation controller 200 estimates the location of the navigation device 100 as an average of the pull point and the location of the anchor access point.

The navigation device 100 may display the radio space map on the display 211 along with the estimated location of the navigation device 100. Optionally, in a service mode, the navigation device 100 may also display the locations of the anchor access points and attractor access points on the display 211. The user input device 203 may be used to enable or disable the service mode. The service mode may include user definable parameters including whether to show the pull points on the display 211, whether to enable or disable a snap to path feature, and whether or not to enforce a maximum speed constraint, which are discussed in more detail below.

The navigation device 100 or the server 120 may terminate a navigation session due to one or more criteria. The user input device 203 may receive a command from a user to turn off the navigation device 100 or to deactivate the position tracking algorithm. The communication interface 205 may receive a command from server 120 that deactivates the position tracking algorithm. The navigation session may also be deactivated based on the position of the navigation device 100. For example, position circuitry 207 may include global positioning system (GPS) circuitry that can determine when the navigation device 100 leaves the radio space. Alternatively, the navigation device 100 may timeout if the scanning for access points does not result in communication with any access points for a predetermined time period (e.g., 1 minute, 10 minutes, or another time).

The user input device 203 includes one or more buttons, keypad, keyboard, mouse, stylist pen, trackball, rocker switch, touch pad, voice recognition circuit, or other device or component for inputting data to the navigation device 100. The user input device 203 and the display 211 may be combined as a touch screen, which may be capacitive or resistive. The display 211 may be a liquid crystal display (LCD) panel, light emitting diode (LED) screen, thin film transistor screen, or another type of display.

The navigation controller 200 or server controller 300 may include a general processor, digital signal processor, an application specific integrated circuit (ASIC), field programmable gate array, analog circuit, digital circuit, combinations thereof, or other now known or later developed processor. The navigation controller 200 or server controller 300 may be a single device or combinations of devices, such as associated with a network, distributed processing, or cloud computing.

The memories 201, 301 may be a volatile memory or a non-volatile memory. The memory 201, 301 may include one or more of a read only memory (ROM), random access memory (RAM), a flash memory, an electronic erasable program read only memory (EEPROM), or other type of memory. The memory 201, 301 may be removable from the navigation device 100, such as a secure digital (SD) memory card.

The communication interfaces 205, 305 may include any operable connection. An operable connection may be one in which signals, physical communications, and/or logical communications may be sent and/or received. An operable connection may include a physical interface, an electrical interface, and/or a data interface. The communication interface 205, 305 provides for wireless and/or wired communications in any now known or later developed format.

The position circuitry 207 may include one or more of a variety of global navigation satellite systems (such as Global Positioning System (GPS), the Russian GLONASS or European Galileo), cellular based positioning systems, and/or any other positioning systems. The position circuitry 207 may also include relative position sensors in an inertial position system or dead reckoning system. Relative positions sensors include but are not limited to magnetic sensors (e.g., magnetometers, compasses), accelerometers, gyroscopes, and altimeters. Magnetic sensors determine the direction and or strength of a magnetic field and can be used to determine heading or orientation. Inertial sensors such as accelerometers and gyroscopes measure acceleration, which can be used to calculate position, orientation, and velocity (direction and speed of movement) of the navigation device 100.

Figure 6:
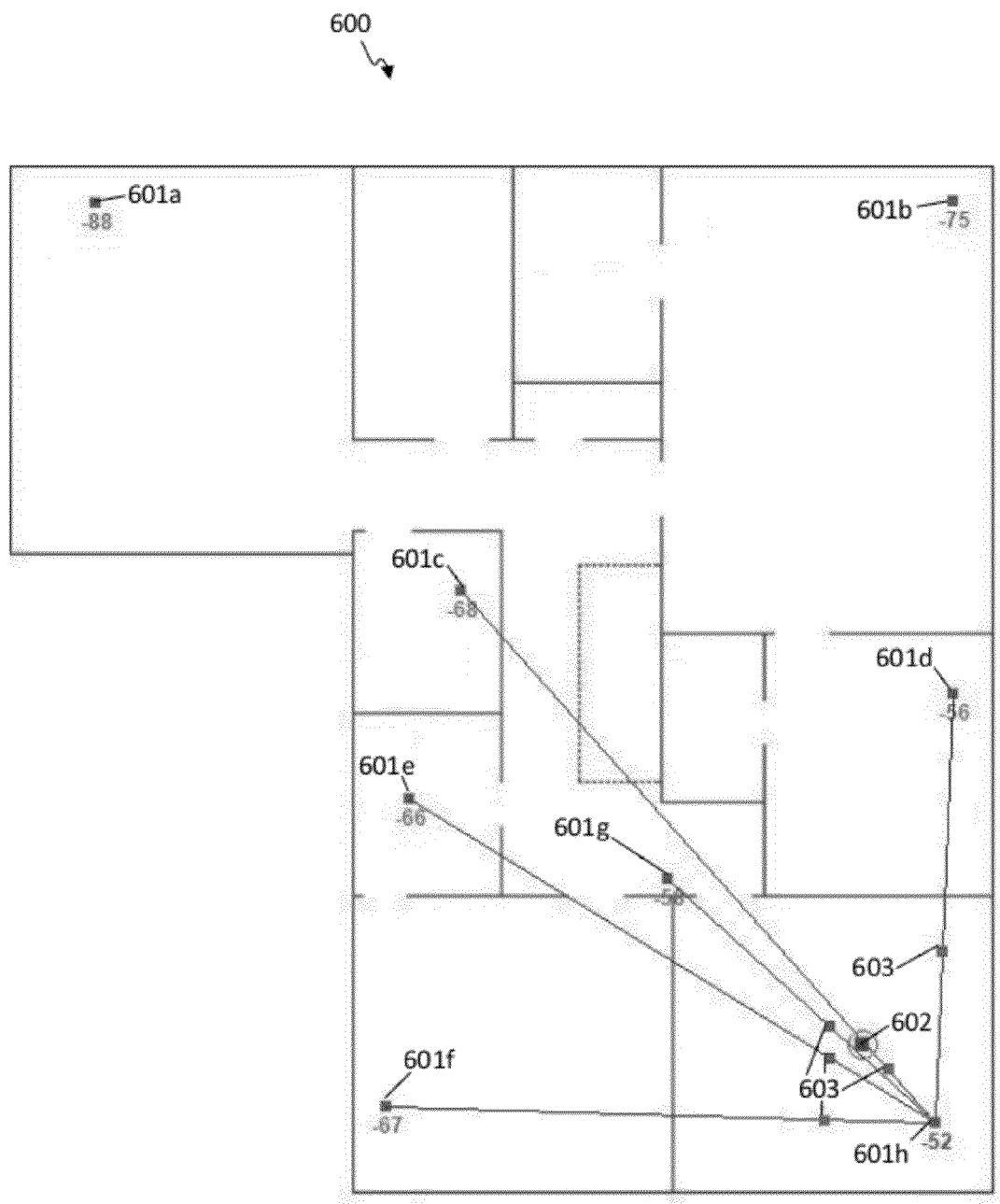
FIG. 6 illustrates another radio space with a navigation device.

FIG. 6 illustrates a radio space 600 including eight access points 601a-h and wireless device 602. The access point 601h with the highest signal strength of −52 signal strength units are designated at the anchor access point. Access points 601c, d, e, f and g have signal strengths above the threshold signal strength and are designated attractor access points. The position tracking algorithm above was used to determine the locations of the pull points 603 and estimate the location of wireless device 602 by averaging the location of the access point 601h with the four locations of the pull points 603.

Figure 7:
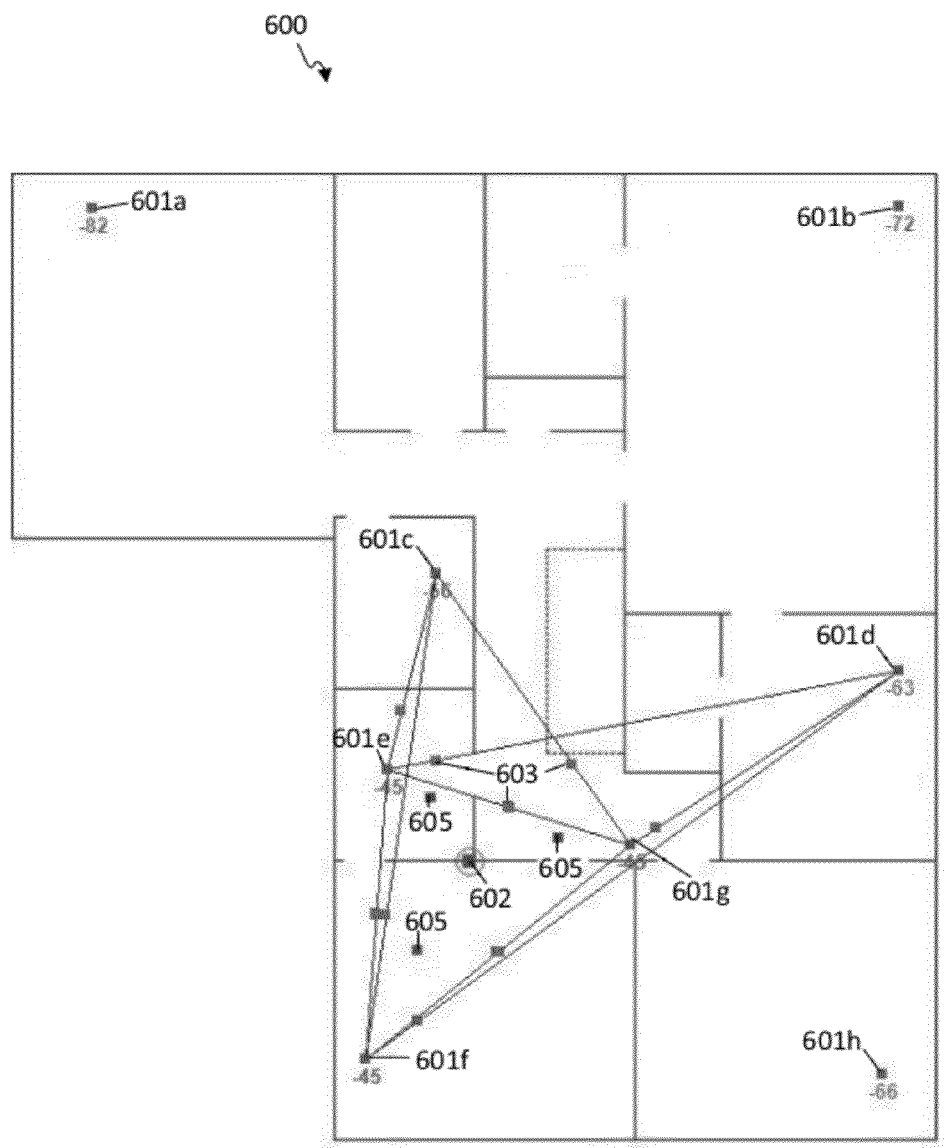
FIG. 7 illustrates the radio space of FIG. 6 with the navigation device at a second position.

FIG. 7 illustrates radio space 600 including eight access points 601a-h and wireless device 602 at another position. In the location shown in FIG. 7, more than one access point is designated as the anchor point. Access points 601e, f, and g report signal strength data to the wireless device that is the same or within the predetermined range to declare the signal strength a tie. Accordingly, the wireless device designates a set of attractor access points for each of the access points 601e, f, and g. With respect to access point 601e, access points c, d, f, and g are attractor access points. With respect to access point 601f, access points c, d, e, and g are attractor access points. With respect to access point 601g, access points c, d, e, and f are attractor access points. The wireless device 602 calculates a pull point 603 (partially labeled) for each pair of anchor access point and attractor access point. The wireless device 602 estimates its current location by averaging the locations of all of the access points and pull points. Alternatively, the location of each anchor access point is averaged with the respective pull points to arrive at intermediate points 605, and the three intermediate points 605 are averaged to estimate the location of the wireless device 602.

The access points may be arranged in any configuration in the radio space 600. An example configuration may position each access point no more than 50 feet from another access point. The access points may be placed at differing vertical locations such as the ceiling, waist level, and the floor. The access points may have network or internet connectivity, but none is necessary. An access point without network connectivity may be referred to as a communication beacon. The only input to the communication beacon is AC power. The ability to transmit packets without network connectivity is sufficient for the location tracking algorithm. One or more of the access points or communication beacons may be Wi-Fi or Bluetooth access points with the antenna removed to lower the range of the access point, creating more deviation between the signal strength received at the wireless device from the various access points.

In one implementation, one or two of the access points has network connectivity but the other access points do not. For example, the radio space may be divided into wireless connectivity areas, sized according to the range of an access point, and wireless positioning areas, sized according to tests of the position tracking algorithm. For example, the radio space 600 may be less than one wireless connectivity and require only one access point to have network connectivity. Further, the radio space 600 may be approximately eight wireless positioning areas and require eight total access points for the position tracking algorithm. Therefore, the ratio of connected access points to not connected access points is 1:7. Other ratios are possible.

Figure 8:
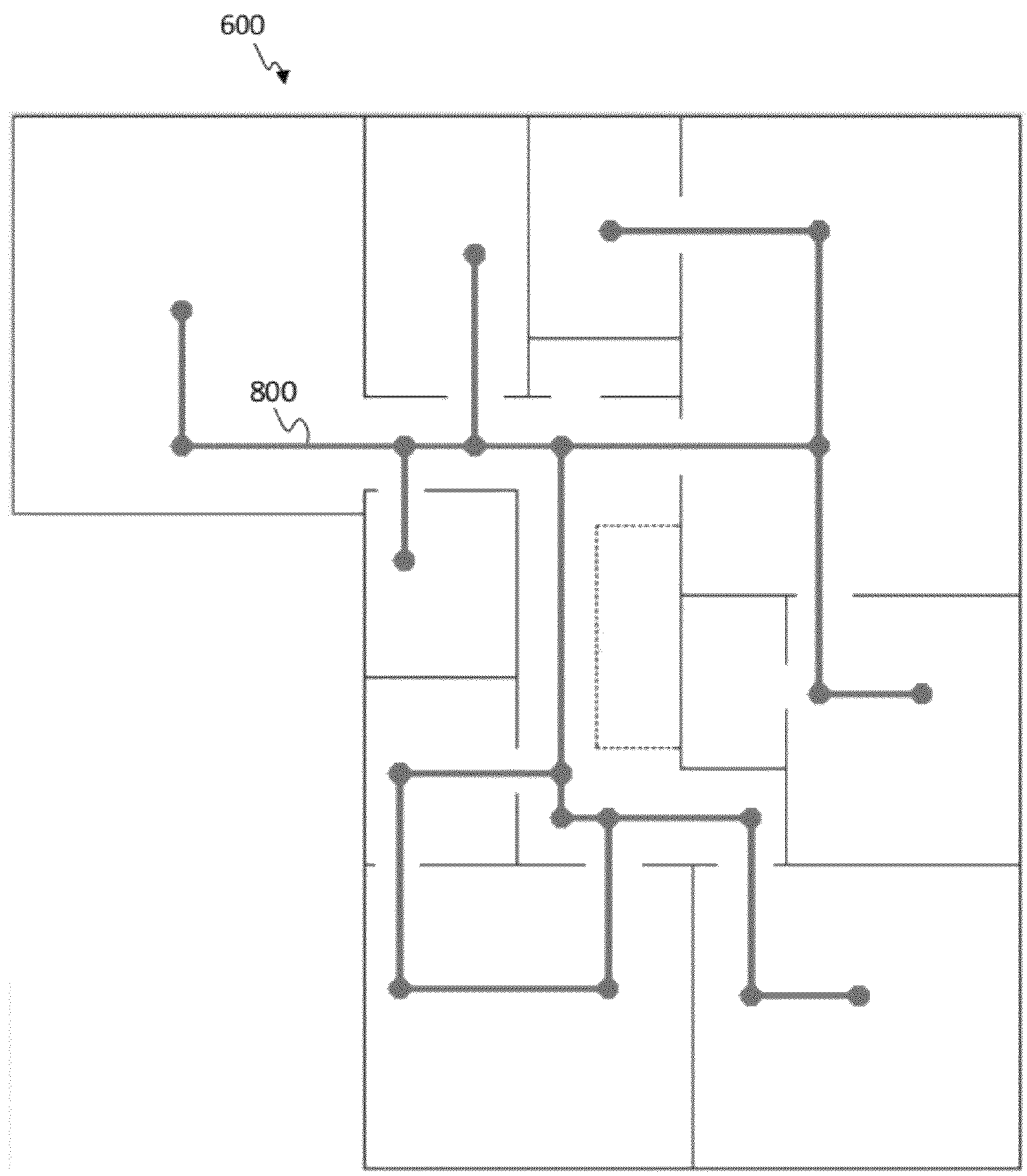
FIG. 8 illustrates the radio space of FIG. 6 with a physical constraint.

FIG. 8 illustrates another view of radio space 600 including a snap path 800. The snap path 800 is a physical model of a path within the radio space 600 that defines where the navigation device 100 (effectively users) can be. For example, the snap map includes or uses data or attributes from the geographic database. The navigation device 100 can estimate its position as on one of the segments or vertices of the snap path 800. In addition, the navigation device 100 may be configured with a maximum speed (e.g., 2.5 mph, 5.0 mph), which corresponds to the top walking speed of most pedestrians. Using the maximum speed constraint and the snap path constraint, the navigation device 100 can reject inaccurate results of the positioning algorithm, which effectively results in accurate positioning with less accurate data.

For example, the navigation controller 200 may "snap" the location that is estimated from the location tracking algorithms to the nearest path segment or vertex (or node), and time-stamp the snap event. If this is the first reported location of the session (i.e., the navigation device 100 recently entered the radio space), the navigation controller 200 accepts and records the snapped coordinates as the current location of the navigation device 100. If this is not the first reported location of the session, the navigation controller 200 computes the shortest route along the path to last snapped (and time-stamped) location of the navigation device 100. If this route is physically possible based on the route's length and the maximum speed limit, the navigation controller 200 accepts and records the new snapped location as the navigation device 100 new current location. Otherwise, the navigation controller 200 rejects the reported location and continues to use the previously recorded location until new location data is received. The snap to path feature prevents the estimation of the of the navigation device 100 at impossible locations such as inside walls or support pillars.

Figure 9:
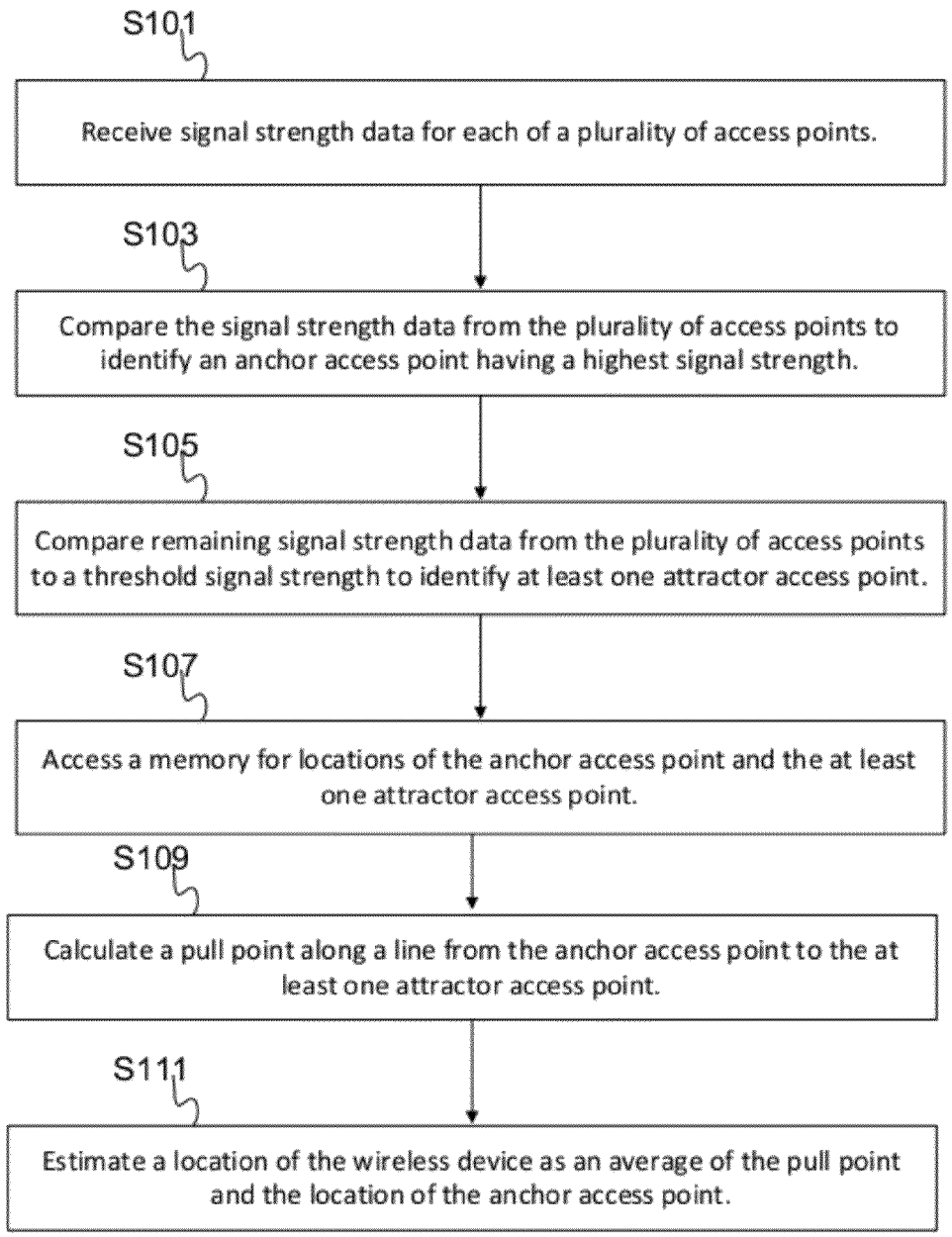
FIG. 9 illustrates a flowchart for the location tracking algorithm.

FIG. 9 illustrates a flow chart for the location tracking algorithm. As discussed with respect to the three embodiments above, some of the steps of the location tracking algorithm may be performed on wireless device 100 and some may be performed on server 120, all of the steps may be performed on server 120, or all of the steps may be performed on wireless device 100. Fewer, more, or different steps or acts may be provided, and a combination of steps may be provided. Also, the steps or acts may be performed in the order as shown or in a different order. The method is implemented by the system and/or devices described herein or by different devices or systems.

At act S101, signal strength data for each of a plurality of access points is received at the navigation controller 200 from the communication interface 205 or at the server controller 300 from the communication interface 305. The navigation controller 200 may calculate the signal strength data from the received signal strength of signals associated with a packet from the respective access point. The MAC addresses of the access points may also be received.

At act S103, the signal strength data from the plurality of access points is compared by the navigation controller 200 or the server controller 300 to identify an anchor access point having a highest signal strength. At act S105, the remaining signal strength data (excluding the signal strength data of the anchor access point) received from the plurality of access points is compared by the navigation controller 200 or the server controller 300 to a threshold signal strength to identify at least one attractor access point, if any. If no access points have signal strength above the threshold signal strength, then no attractor access points are identified.

At act S107, a database or another memory is accessed for the locations of the anchor access point and/or the at least one attractor access point. The server controller 300 may access the database 130 for the location(s). The navigation controller 200 may access the database 130 by way of the server 120. The server 120 may provide the location(s) to the navigation device ahead of time in response to a request for the radio map including at least one MAC address of an access point, and the navigation controller 200 may access the memory 201 for the location(s).

At act S109, the navigation controller 200 or the server controller 300 calculates a pull point along a line from the anchor access point to the at least one attractor access point. The location may be based on a pull factor that is selected based on the difference between the signal strength of the attractor access point and the signal strength of the anchor access point. If no anchor access points are identified in act S103, act S109 may be omitted.

At act S111, the navigation controller 200 or the server controller 300 estimates a location of the wireless device as an average of the pull point and the location of the anchor access point. If no anchor access points are identified in act S103, the navigation controller 200 or the server controller estimates the location of the wireless device as the location of the anchor access point.

In one implementation, acts S101, S103, S105, and S109 are repeated a predetermined number of times before the location of the location of the wireless device is estimated. The predetermined number of times may be any integer (e.g., 2, 3, or 10 times). If the calculation of the pull points vary among the iterations, the average of the pull points from all iterations are used in estimating the location of the wireless device. This approach may be particularly effective in reducing the quarter wavelength effect that the wireless device may suffer from. The quarter wavelength effect causes the signal strength from any access point to fluctuate by several signal strength units based on the physical orientation of the navigation device 100 with respect to the access point.

In addition, the signal strength may be measured in bars or another integer scale, with a variable number of dbm corresponding to each bar or interval. For example, one bar may correspond to signal strength as low as −120 signal strength units, two bars may corresponds to a signal strength as low as −100 signal strength units, three bars may corresponds to a signal strength units as low as −80 signal strength units, four bars may corresponds to a signal strength as low as −70 signal strength units, and five bars may corresponds to a signal strength at −60 signal strength units or higher.

The embodiments described above may be implemented using computer executable instructions stored in the memory 201 and/or the memory 301, which are non-transitory. The processors may execute computer executable instructions. The computer executable instructions may be written in any computer language, such as C++, C#, Java, Pascal, Visual Basic, Perl, HyperText Markup Language (HTML), JavaScript, assembly language, extensible markup language (XML) and any combination thereof.

The computer executable instructions may be logic encoded in one or more tangible media or one or more non-transitory tangible media for execution by the processors. Logic encoded in one or more tangible media for execution may be defined as instructions that are executable by the processors and that are provided on the computer-readable storage media, memories, or a combination thereof. Instructions for instructing a network device may be stored on any logic. As used herein, "logic", includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The computer readable instructions may be stored on any non-transitory computer readable medium. A non-transitory computer readable medium may include, but are not limited to, a floppy disk, a hard disk, an ASIC, a compact disk, other optical medium, a random access memory (RAM), a read only memory (ROM), a memory chip or card, a memory stick, and other media from which a computer, a processor or other electronic device can read.

As used herein, the phrases "in communication" and "couple" are defined to mean directly connected to or indirectly connected through one or more intermediate components. Such intermediate components may include both hardware and software based components.

Various embodiments described herein can be used alone or in combination with one another. The foregoing detailed description has described only a few of the many possible implementations of the present invention. It is intended that the foregoing detailed description be regarded as illustrative rather than limiting and that it is understood that the following claims including all equivalents are intended to define the scope of the invention.

I claim:

1. A method of tracking a wireless device, the method comprising:
   receiving signal strength data for each of a plurality of access points;
   comparing the signal strength data from the plurality of access points to identify an anchor access point having a highest signal strength;
   comparing remaining signal strength data from the plurality of access points to a threshold signal strength to identify at least one attractor access point;
   accessing a memory for coordinates of the anchor access point and coordinates of the at least one attractor access point;
   calculating a pull point along a line from the anchor access point to the at least one attractor access point; and
   estimating a location of the wireless device as an average of the pull point and the coordinates of the anchor access point.

2. The method of claim 1, wherein a distance between the pull point and the anchor access point is based on a signal strength of a respective attractor access point.

3. The method of claim 2, further comprising:
   accessing a lookup table with the signal strength of the at least one attractor access point to retrieve a factor defining the distance between the pull point and the attractor access point.

4. The method of claim 1, further comprising:
scanning, using the wireless device, a radio space for the plurality of access points;
receiving, at the wireless device, a packet for each of the plurality of access points, the packet including a media access control address; and
determining, at the wireless device, the signal strength data for each of the plurality of access points based on received signal strengths associated with packets from each of the plurality of access points.

5. The method of claim 1, further comprising:
calculating the threshold signal strength as a predetermined level less than the highest signal strength, wherein signal strengths of each of the at least one attractor access points are greater than the threshold signal strength and less than the highest signal strength.

6. The method of claim 1, further comprising:
receiving a plurality of addresses, wherein each address corresponds to one of the plurality of access points; and
identifying the radio space based on the plurality of addresses.

7. The method of claim 1, further comprising:
receiving a radio map including a snap path;
comparing the estimated location of the wireless device to the snap path; and
determining a location on the snap path closest to the estimated location of the wireless device.

8. The method of claim 1, wherein comparing the signal strength data from the plurality of access points to identify the anchor access point having the highest signal strength comprises comparing the signal strength data to identify a plurality of anchor access points have a range of highest signal strengths.

9. The method of claim 8, wherein estimating the location of the wireless device comprises averaging a plurality of pull points and the locations of the plurality of anchor access points.

10. An apparatus for determining the location of a wireless device, the apparatus comprising:
a memory configured to store identities and locations for a plurality of access points;
a communication interface configured to receive signal strength data for each of the plurality of access points;
a controller configured to compare the signal strength data for the plurality of access points to identify an anchor access point and an attractor access point and configured to determine a location of the wireless device as an average of the location of the anchor access point and a pull point along a line from the anchor access point to the attractor access point, wherein the pull point is defined by a relative signal strength of the attractor access point.

11. The apparatus of claim 10, wherein the controller is further configured to designate an access point having a highest signal strength of the plurality of access points as the anchor access point.

12. The apparatus of claim 10, wherein the controller is further configured to designate each access point of the plurality of access points having a signal strength above a predetermined threshold as one of a plurality of attractor access points.

13. The apparatus of claim 10, wherein the controller is further configured to access a lookup table with the signal strength of the attractor access point to retrieve a factor defining a distance between the pull point and the attractor access point.

14. The apparatus of claim 10, wherein the communication interface is configured to scan a radio space for the plurality of access points and receive a packet including a media access control address for at least one of the plurality of access points, and wherein the controller is configured to calculate the signal strength data based on a received signal strength of the packet and configured to receive locations for the plurality of access points according to the media access control address.

15. The apparatus of claim 10, wherein the controller calculates the threshold signal strength as a predetermined level less than the highest signal strength.

16. The apparatus of claim 10, wherein the memory stores a radio map including a snap path, and the controller is configured to determine a location on the snap path closest to the estimated location of the wireless device.

17. A non-transitory computer readable medium configured to store a computer program configured to perform a method for location tracking of a wireless device, the method comprising:
receiving signal strength data for each of a plurality of communication beacons;
comparing the signal strength data to identify an anchor having a highest signal strength of the plurality of communication beacons;
comparing the signal strength data of the plurality of communication beacons except the anchor to a threshold signal strength;
if none of the signal strength data of the plurality of communication beacons except the anchor is greater than the threshold signal strength, estimating a location of the wireless device based on location data of the anchor; and
if any of the signal strength data of the plurality of communication beacons except the anchor is greater than the threshold signal strength, then:
designating at least one of the communication beacons, except the anchor, having signal strength data greater than the threshold signal strength as an attractor;
calculating location data for a pull point along a line from the anchor to the attractor; and
estimating a location of the wireless device as an average of the location data of the pull point and the location data of the anchor.

18. The non-transitory computer readable medium of claim 17, wherein the anchor or the attractor is an access point in communication with a network.

19. The non-transitory computer readable medium of claim 17, the method comprising:
receiving a radio map including a snap path;
comparing the estimated location of the wireless device to the snap path; and
determining a location on the snap path closest to the estimated location of the wireless device.

20. The non-transitory computer readable medium of claim 17, wherein comparing the signal strength data to identify the anchor having the highest signal strength comprises comparing the signal strength data to identify a plurality of anchors have a range of highest signal strengths.

* * * * *

UNITED STATES PATENT AND TRADEMARK OFFICE
CERTIFICATE OF CORRECTION

| | | |
|---|---|---|
| PATENT NO. | : 8,548,493 B2 | |
| APPLICATION NO. | : 13/115499 | |
| DATED | : October 1, 2013 | |
| INVENTOR(S) | : Rieger, III | |

It is certified that error appears in the above-identified patent and that said Letters Patent is hereby corrected as shown below:

In the claims:
Column 16, Lines 20 - 46
claim 17, should read
"A non-transitory computer readable medium configured to store a computer program including instructions configured to cause a processor to:
 receive signal strength data for each of a plurality of communication beacons;
 compare the signal strength data to identify an anchor having a highest signal strength of the plurality of communication beacons;
 compare the signal strength data of the plurality of communication beacons except the anchor to a threshold signal strength;
 if none of the signal strength data of the plurality of communication beacons except the anchor is greater than the threshold signal strength, estimate a location of the wireless device based on location data of the anchor; and
 if any of the signal strength data of the plurality of communication beacons except the anchor is greater than the threshold signal strength, then:
  designate at least one of the communication beacons, except the anchor, having signal strength data greater than the threshold signal strength as an attractor;
  calculate location data for a pull point along a line from the anchor to the attractor; and
  estimate a location of the wireless device as an average of the location data of the pull point and the location data of the anchor.".

Signed and Sealed this
Eighth Day of April, 2014

Michelle K. Lee
*Deputy Director of the United States Patent and Trademark Office*

CERTIFICATE OF CORRECTION (continued)
U.S. Pat. No. 8,548,493 B2

Column 16, Lines 50 - 56
claim 19, should read
"The non-transitory computer readable medium of claim 17, the computer program including instructions configured to cause the processor to:
    receive a radio map including a snap path;
    compare the estimated location of the wireless device to the snap path; and
    determine a location on the snap path closest to the estimated location of the wireless device.".